United States Patent
Wu et al.

(10) Patent No.: US 8,675,740 B2
(45) Date of Patent: *Mar. 18, 2014

(54) HYPOTHETICAL REFERENCE DECODER

(71) Applicant: Apple Inc., Cupertino, CA (US)

(72) Inventors: Hsi-Jung Wu, San Jose, CA (US); Barin Geoffry Haskell, Mountain View, CA (US); Xiaojin Shi, Santa Cruz, CA (US); James Oliver Normile, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/731,819

(22) Filed: Dec. 31, 2012

(65) Prior Publication Data

US 2013/0182778 A1 Jul. 18, 2013

Related U.S. Application Data

(63) Continuation of application No. 12/013,094, filed on Jan. 11, 2008, now Pat. No. 8,345,774.

(51) Int. Cl.
*H04N 7/12* (2006.01)
(52) U.S. Cl.
USPC ............ 375/240.25; 375/240.02; 375/240.08
(58) Field of Classification Search
USPC .................. 375/240, 240.01, 240.02, 240.08, 375/240.25, 295, 316
See application file for complete search history.

(56) References Cited

U.S. PATENT DOCUMENTS

| 7,075,584 | B2 * | 7/2006 | Crinon | 348/518 |
| 7,453,938 | B2 | 11/2008 | Haskell et al. | |
| 2005/0175098 | A1 * | 8/2005 | Narasimhan et al. | 375/240.12 |
| 2005/0201471 | A1 * | 9/2005 | Hannuksela et al. | 375/240.25 |
| 2006/0198446 | A1 * | 9/2006 | Ribas-Corbera et al. | 375/240.25 |
| 2007/0002946 | A1 * | 1/2007 | Bouton et al. | 375/240.01 |
| 2007/0153914 | A1 | 7/2007 | Hannuksela et al. | |
| 2007/0201500 | A1 * | 8/2007 | Deshpande | 370/412 |
| 2008/0232459 | A1 * | 9/2008 | Auyeung | 375/240.01 |
| 2010/0034254 | A1 * | 2/2010 | Wang | 375/240.01 |
| 2010/0091837 | A1 * | 4/2010 | Zhu et al. | 375/240.01 |

\* cited by examiner

*Primary Examiner* — Kwang B Yao
*Assistant Examiner* — Nguyen Ngo
(74) *Attorney, Agent, or Firm* — Kenyon & Kenyon LLP

(57) ABSTRACT

Disclosed is a system and method of controlling a video decoder, including a reviewing channel data representing coded video data generated by an encoder to identify parameters of a hypothetical reference decoder (HRD) used by the encoder during coding operations. A parameter representing an exit data rate requirement of a coded picture buffer (CPB) of the HRD is compared against exit rate performance of the video decoder. If the exit rate performance of the video coder matches the exit rate requirement of the HRD, the coded video data is decoded, otherwise, a certain decoding degradation scheme can be applied, including disabling decoder from decoding the coded video data.

6 Claims, 4 Drawing Sheets

HYPOTHETICAL REFERENCE DECODER

RELATED APPLICATIONS

This application is a continuation of U.S. patent application Ser. No. 12/013,094 filed on Jan. 11, 2008, which will issue on Jan. 1, 2013 as U.S. Pat. No. 8,345,774.

The present invention relates to video decoders and, more specifically, to an improved video encoder/decoder that utilizes an improved hypothetical reference decoder.

BACKGROUND

Video coding refers generally to coding motion picture information to transmission over a bandwidth limited channel. Various video coding techniques are known. The most common techniques, such as those are standardized in the ITU H-series and MPEG-series coding specifications, employ motion compensation prediction to reduce channel bandwidth. Motion compensated video coders exploit temporal redundancy between frames of a video sequence by predicting video content of a new frame currently being decoded with reference to video content of other frames that were previously decoded. At a decoder, having received and decoded a first number of frames, the video decoder is able to use decoded video content of the previously decoded frames to generate content of other frames.

An encoder often estimates performance of a hypothetical reference decoder (HRD) to confirm coding decisions that it makes during the coding process. The operation of an HRD is described in the H.264 standard. A simplified description of the operation of the HRD of H.264 is presented with reference to FIGS. 1 and 2. FIG. 1 illustrates a general view of the encoding and decoding process, while FIG. 2 illustrates a general block diagram of an HRD. During coding of a source video sequence, an encoder 110 refers to a HRD, a model of decoder performance. By modeling decoding performance through the HRD, the encoder 110 may estimate how its selection of coding parameters might affect decoding performance. Once the encoder has encoded the data that should satisfy performance requirements of the HRD per the H.264 standard, encoded data can be delivered via network 130 to a decoder 120. For example, the decoder can be one that is used in an iPod® or other similar device. The decoder 120 is expected to perform at least as well as the decoder represented by the HRD in terms of speed and accuracy of output. In the decoder 120, encoded data enters a coded picture buffer (CPB), is decoded by a decode process and buffered in a decoded picture buffer (DPB).

According to the standard H.264, the encoded data is assumed to be decoded instantaneously in the HRD by an instantaneous decoding process at the CPB removal time. Compliance with the standard H.264 is typically maintained in practical decoders by providing a CPB and a corresponding DPB that is larger than that required to comply with the standard. Presently, CPB size is determined by the encoder, which encodes the data, inserts size and other parameters, such as input rate, in the encoded data bitstream.

With reference to FIG. 2, a conventional HRD 200 models a video decoder that includes a CPB 210, decoder 220, and a DPB 240. Per standard H.264, the HRD models input rate of the channel into the CPB 210 as finite, but the output rate to a decoder 220 is infinite. The CPBs in practical real-world decoders will have a finite exit rate. The decoder 220 also is presumed to have an infinite output rate.

The CPB 210 as modeled by the HRD receives encoded from the channel at an input rate shown, for discussion purposes, as $R_{IN}$ in the figure. The input rate $R_{IN}$ can be included in video usability information (VUI), as discussed in the standard. More specifically, the VUI may contain "timing information" and/or "HRD parameters". More specifically still, the timing information may specify the time between output pictures from the DPB. The HRD parameters may specify, for example, the CPB size and the maximum input bit rate. There may be several CPB size/input bitrate specifications (called "schedules"), in which case the bitstream is expected to allow correct HRD operation for each schedule. Generally, the standard H.264 basically specifies an encoder that will not overflow or underflow a CPB, if provisioned as identified in bitstream. The decoder 220 receives the encoded data from the CPB at an exit rate that is not modeled (infinity), decodes the data instantaneously via a decode process, and forwards the data at an exit rate of infinity to the decoded picture buffer (DPB). The DPB is modeled to have a finite output rate, which is shown, for discussion purposes, as $R_{OUT}$ in the figure. The output rate $R_{OUT}$ can be included in the supplemental enhancement information (SEI) in the standard. More specifically, the SEI may contain "Buffering period" messages and "Picture timing" messages for each schedule. More specifically still, the Buffering period messages may specify initial CPB removal delays both at the beginning of the video and at random access points within the video. The Picture timing messages may specify CPB removal delay and DPB removal delay on a per picture basis.

Real world decoders 220 can be either hardware or software devices. In hardware decoders, the CPB 210 is commonly a memory component whose size is predetermined at the time of manufacture. In software (SW) decoders, the CPB 210 is commonly a span of memory allocated from a larger memory space. Software latency can cause input rates and exit rates to vary instantaneously even though overall input and exit rates may be steady.

Since present encoders use the H.264 standard HRD to model a CPB having a finite input rate and a finite size but an infinite exit rate, the HRD can artificially lower the size required for CPBs to buffer the coded video data. Often, decoder designers will make accommodation for CPBs that are much larger, i.e., have a memory capacity greater than necessary to ensure overflow/underflow events, as specified by the H.264 standard, do not occur. Of course, a designer can specify their own buffer accommodations, overflow/underflow events, or other coding/decoding parameters as desired.

The CPB of HRD 200, although having a finite input bitrate, has a theoretical infinite output bitrate, which is impractical. There is a need to implement a system that allows for modeling the output bitrate of the CPB to a practical limit. A practical limit on the output bitrate allows for more efficient allocation of buffer and decoder resources for decoding picture data for output.

DETAILED DESCRIPTION

Disclosed is a method of controlling a video decoder, including a monitoring of channel data representing coded video data generated by an encoder to identify parameters of a hypothetical reference decoder (HRD) used by the encoder during coding operations. A parameter representing an exit data rate requirement of a coded picture buffer (CPB) of the HRD is compared against exit rate performance of the video decoder. If the exit rate performance of the video decoder matches the exit rate requirement of the HRD, the coded video data is decoded. Otherwise, the video decoder may be disabled from decoding the coded video data with full speed and accuracy.

Further disclosed is a method of controlling a video decoder having multiple decoding profiles, including monitoring channel data representing coded video data generated by an encoder to identify parameters of a hypothetical reference decoder (HRD) used by the encoder during coding operations. A parameter representing an exit data rate requirement of a coded picture buffer (CPB) of the HRD is compared against exit rate performance of the video decoder's profiles. If the exit rate performance of at least one decoder profile matches the exit rate requirement of the HRD, a matching decoder profile is selected, and decoding the coded video data using the selected decoder profile proceeds. Otherwise, apply a degradation scheme, including disabling the video decoder from the decoding the coded video data.

The disclosed coding and decoding method and system include an exit rate estimate capability in the improved HRD and identify the exit rate in the coded video bitstream. Decoders, both software and hardware, can make more efficient allocations of CPB buffer sizes using the improved HRD as described below.

Figure 1:
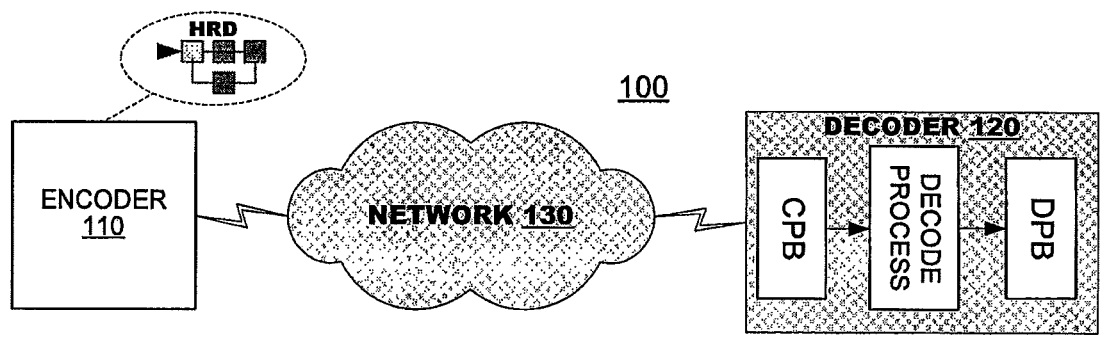
FIG. 1 is a simplified block diagram of a video encode/decode process.
Figure 2:
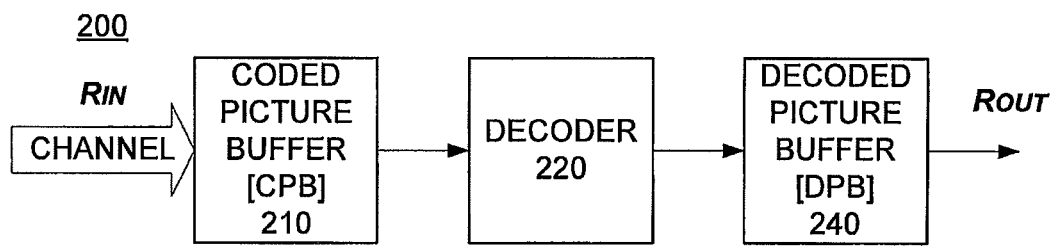
FIG. 2 illustrates details of the decoder process 120 of FIG. 1.
Figure 3:
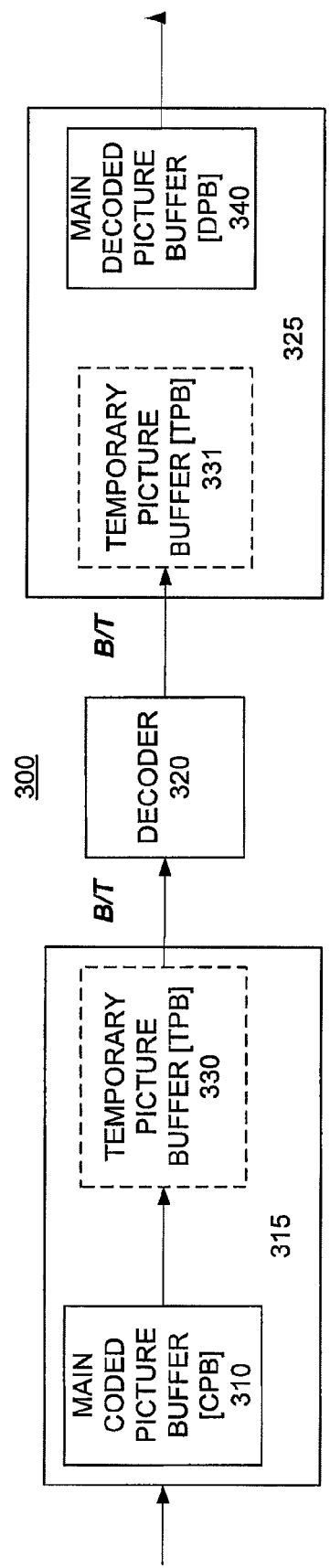
FIG. 3 illustrates an improved hypothetical reference decoder (HRD) according to an embodiment of the present invention.

FIG. 3 illustrates an improved hypothetical reference decoder (HRD) according to an embodiment of the present invention. The HRD 300 models a video decoder comprising a coded picture buffer (CPB) 315, a decoder 320, and a decoded picture buffer (DPB) 325.

According to the present embodiments, the HRD 300 models a CPB 315 and/or a decoder 320 using a parameter representing an exit rate of the CPB 315. The exit rate is illustrated in FIG. 3 as a dual value parameter B/T, where B can represent a quantity of bits B of coded data and T is a time interval between the first bit of the B-sized set of coded data and a subsequent first bit of the next B-sized set of coded data being provided to the CPB 315. Alternatively, T can be another time interval suitable for use in specifying a decoder and buffer capabilities. By providing a finite exit rate of data from the CPB 315 and/or decoder 320 in the bitstream, the sizing of both the CPB 315 and the DPB 325 as well as the capabilities of the decoder 320 can be optimized. The encoder using the exit rate provided by the HRD 300 preferably constructs a bitstream compliant with the H.264 Standard. Based on the more precise modeling of the decoding process, a more efficient use of buffer and decoder resources can be made. The exit rate parameter B/T can be included in the coded bitstream or as an out-of-band message at various synchronization points in the bitstream.

By using the HRD 300, the coded data in the CPB 315 can be expected to exit the CPB in B-bit sizes within a time interval T as opposed to the infinite exit rate of conventional HRDs.

In another embodiment, an exit rate of the decoder 320 also can be modeled by the HRD. Again, previously known HRDs presume that a decoder processes data instantaneously and that the input rate to the DPB is infinite. Under the current proposal, the input rate of the DPB can be modeled as a finite quantity.

As noted previously, the H.264 standard includes its own HRD, which models a CPB having a finite input data rate and an infinite exit data rate. The principles of the present invention extend this model by constraining the exit data rate to a finite quantity. If convenient, the CPB 315 of the present invention may be modeled as having two components provided therein—an H.264 CPB 310 and a temporary picture buffer (TPB) 330. The H.264 CPB 310 may be modeled according to conventional norms, having a finite input data rate and an infinite exit rate. The TPB 330 is modeled as receiving data from the H.264 CPB 310 and, therefore, is modeled as having an infinite input rate. The TPB 330 further may be modeled as having a finite exit rate as discussed above. In this regard, it is equivalent to consider the CPB 315 as a single buffer having finite input and exit rates or as a concatenation of two buffers, one of which has a finite input rate but an infinite exit rate and the second of which as an infinite input rate but a finite exit rate.

As noted previously, the H.264 standard includes its own HRD, which models a DPB having a infinite input data rate and a finite exit data rate. The principles of the present invention extend this model by constraining the input data rate to a finite quantity. If convenient, the DPB 325 of the present invention may be modeled as having two components provided therein—a temporary picture buffer (TPB) 331 and an H.264 DPB 340. The H.264 DPB 340 may be modeled according to conventional norms, having an infinite input data rate and a finite exit rate. The TPB 331 is modeled as receiving data from the decoder 320 and, therefore, is modeled as having an infinite input rate. The TPB 331 further may be modeled as having a finite input rate equal to the finite exit rate of the decoder 320 as discussed above. In this regard, it is equivalent to consider the DPB 325 as a single buffer having finite input and exit rates or as a concatenation of two buffers, one of which has a finite input rate but an infinite exit rate and the second of which as an infinite input rate but a finite exit rate.

As noted, as an encoder codes source video data, it models performance of a decoder using the data rate constraints via the HRD to determine if processing errors are likely to arise when a decoder processes coded video data to recover the source video. If no processing errors are detected, the encoder validates the coded video data and stores the coded video data in a file for later use along with data identifying HRD parameters used during coding. According to an embodiment of the present invention, the file may include the CPB exit rate parameter and DPB input rate parameters discussed above. A decoder may refer to these parameters when receiving the file and determine whether or how to decode the coded video data in response thereto.

Figure 4:
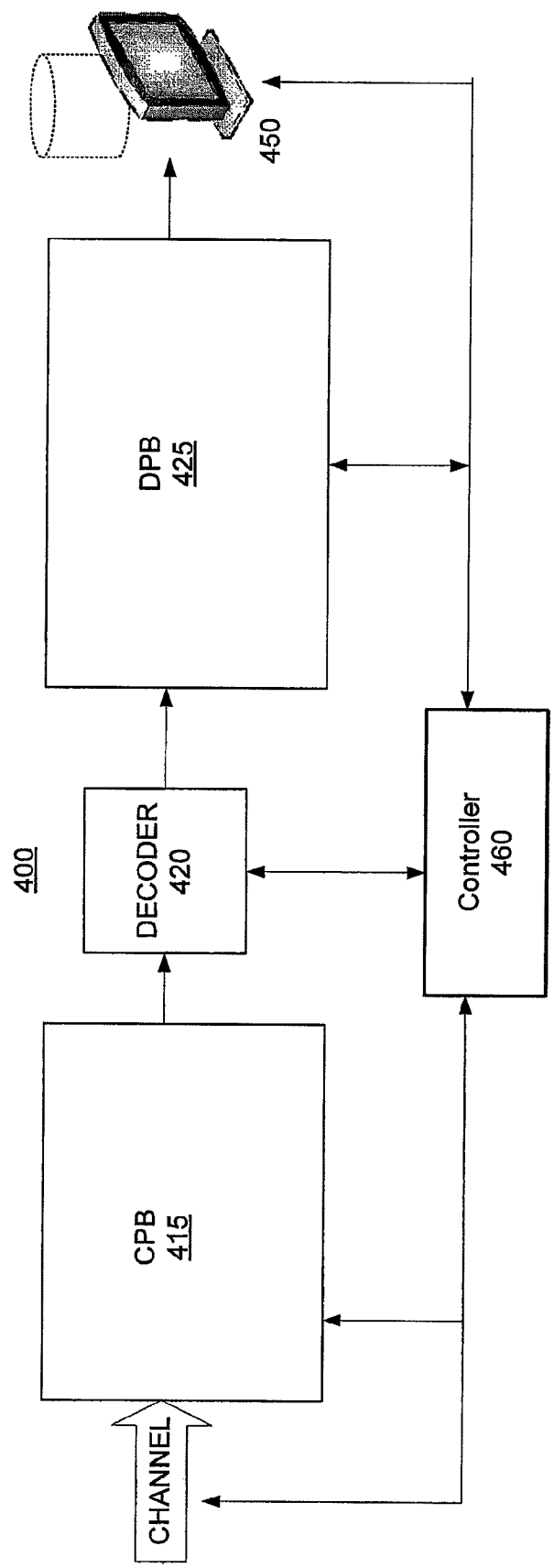
FIG. 4 illustrates an exemplary decoder system 400 according to an embodiment of the present invention.

FIG. 4 illustrates an exemplary decoder system 400 according to an embodiment of the present invention. The decoder system 400 can comprise a CPB 415, a decoder 420, a DPB 425, an output device 450 and a controller 460. The CPB 415 may receive channel data which includes the file generated by an encoder (not shown). During decoding, the CPB 415 may store coded video data to be processed by the decoder 420. Once the decoder 420 generates recovered video data, it may output the recovered video data in a DPB 425 for further processing. For example, modern video decoders operate on coded frames of video in a coding order that differs from a display order. Thus, DPBs often buffer and reorder decoded frames of data before they are rendered on a display device 450. In this manner, the structure and operation of decoders 400 is well known.

All decoders are resource constrained devices, but the resources may vary considerably from decoder to decoder. Thus, the CPB 415 of each decoder may have predetermined limits upon its input data rate and its exit data rate. Similarly, the DPB 425 may have predetermined limits upon its input data rate and its exit data rate. In hardware devices, the sizes and data rates of each buffer 415, 425 typically may be determined when the devices are designed. Although software devices may provide for some flexibility in buffer size and data rates, they also have limits; further, resources allocated to decoder software elements would not be available for other applications that may compete with the decoder software for resources. According to an embodiment of the present invention, a decoder controller 460 may review the CPB exit rate parameters and/or DPB input rate parameters from a coded video data file and compare it to the decoder's local capabilities to determine whether or how to decode it.

Software decoders by their nature allow for a plurality of different configurations or profiles. The decoder profiles can specify a number of different resources, such as decoders of varying capabilities, buffer sizes and buffer data rates. Depending upon the requirements of the encoder, various combinations of decoders and buffers can be assigned for decoding the coded data. As stated above, the differing profiles may not be available if the decoder resources are allocated to other applications.

Figure 5:
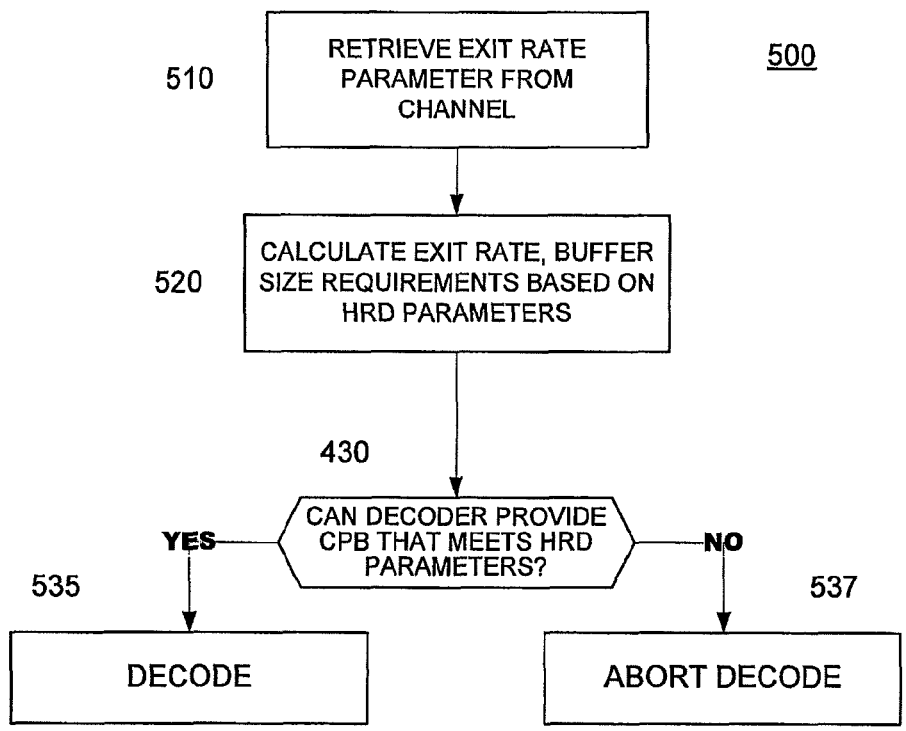
FIG. 5 illustrates a method for processing CPB exit rate parameters and/or DPB input rate parameters according to an embodiment of the present invention

FIG. 5 illustrates a method for processing CPB exit rate parameters and/or DPB input rate parameters according to an embodiment of the present invention. A decoder system monitors channel data representing coded video data generated by an encoder to identify parameters of a hypothetical reference decoder (HRD) used by the encoder during coding operations. The monitoring of channel data can be performed by known techniques and at conventional intervals. The exit rate parameter (B/T) is retrieved from the encoded video data bitstream from a channel (510). Using the exit rate parameter, a buffer size for the CPB is determined based on the HRD parameters (e.g., B/T) (520). At step 530, a decision is made whether a decoder is available that can provide a CPB that meets the HRD parameters. This decision can be made by comparing a parameter representing an exit data rate requirement of a coded picture buffer (CPB) of the HRD against exit rate performance of the video decoder, if the exit rate performance of the video decoder matches the exit rate requirement of the HRD, decoding the coded video data (535), and if it does not, certain degradation scheme can be applied. Under certain conditions, the decoding may be aborted (537).

Figure 6:
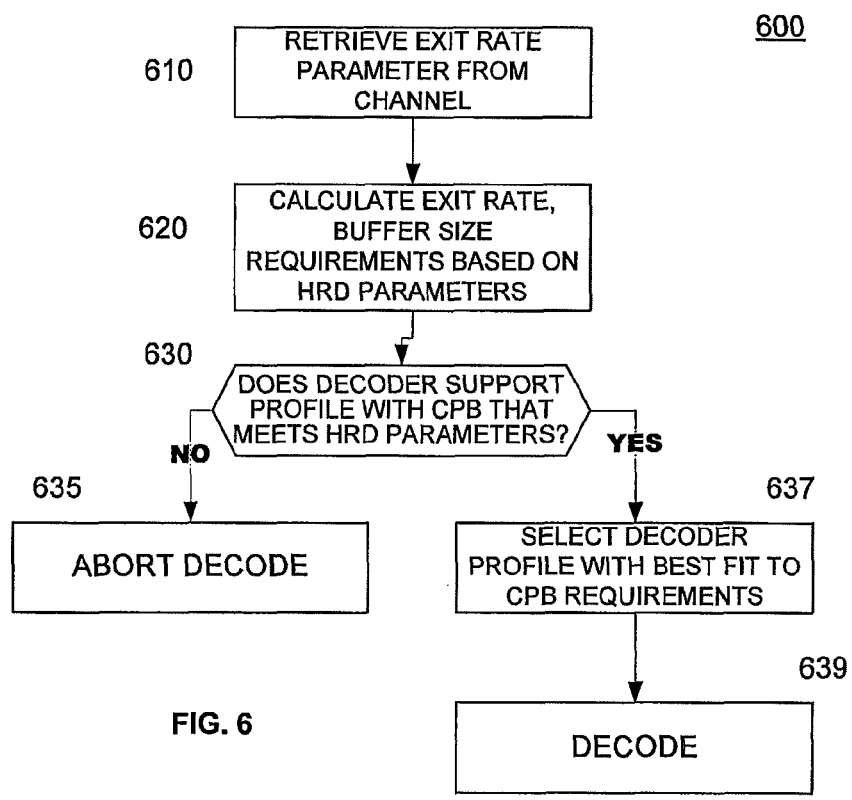
FIG. 6 illustrates another process incorporating the features of an improved HRD according to another embodiment of the present invention.

FIG. 6 illustrates another process incorporating the features of an improved HRD according to another embodiment of the present invention. A decoder system monitors channel data representing coded video data generated by an encoder to identify parameters of a hypothetical reference decoder (HRD) used by the encoder during coding operations. The exit rate parameter (B/T) can be retrieved from the encoded video data bitstream from a channel 610. Using the exit rate parameter, a buffer size for the CPB is determined based on the HRD parameters (e.g., B/T) (620). At step 630, a decision is made whether a decoder is available that can provide a CPB that meets the HRD parameters. This decision can be made by comparing a parameter representing an exit data rate requirement of a coded picture buffer (CPB) of the HRD against exit rate performance of the video decoder's profiles, if the exit rate performance of at least one decoder profile matches the exit rate requirement of the HRD, selecting a matching decoder profile (637) and decoding the coded video data using the selected decoder profile (639), otherwise, apply certain degradation scheme, for example, discard droppable frames, or disabling the video decoder from decoding the coded video and abort decoding (635).

The foregoing description provides an HRD that estimates CPB exit rate parameters and/or DPB input rate parameters of a decoder. The improved HRD model is expected to be useful to decoder designers to provide better estimates of CPB and/or DPB buffers sizes that will be needed to decode coded video data. It is also useful to encoder designers to achieve better performance, both in terms of video quality and encoding resource usage, since more accurate decoder model information is available. As noted above, the undefined nature of the CPB exit rate parameters and/or DPB input rate parameters often led decoder designers to over-estimate buffer sizes that would be needed for these respective units, often by large margins. By improving the HRD model as proposed above, it is expected that decoder designers will be able to design decoders using buffer size estimates that track real-world decoding environments more accurately than possible under the prior models.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A video decoder, comprising:
 a coded picture buffer for receiving channel data representing coded video data generated by an encoder;
 a decoding engine to decode the coded video data;
 a decoded picture buffer for buffering decoded video data; and
 a controller configured to monitor the channel data to identify a parameter of a hypothetical reference decoder (HRD) used by the encoder during coding operations, and to compare a parameter representing an exit data rate requirement of a coded picture buffer (CPB) of the HRD against exit rate performance of the decoded picture buffer,
 if the exit rate performance of the decoded picture buffer does not match the exit rate requirement of the HRD, the controller is further configured to apply a degradation scheme, including by disabling the video decoder from decoding the coded video data.

2. The decoder of claim 1, wherein the exit data rate requirement of the CPB is the exit data rate of the CPB and a temporary picture buffer.

3. The decoder of claim 1, wherein the parameter is included in an out-of-band message at a synchronization point in the channel data.

4. A video decoder having multiple decoding profiles, comprising:
 a coded picture buffer for receiving channel data representing coded video data generated by an encoder,
 a decoded picture buffer for buffering decoded video data;
 a controller configured to monitor the channel data to identify a parameter of a hypothetical reference decoder (HRD) used by the encoder during coding operations, to compare a parameter representing an exit data rate requirement of a coded picture buffer (CPB) of the HRD against exit rate performance of the video decoder's profiles, and to select a decoder profile; and a decoding engine to decode the coded video data using the selected decoder profile;

if the exit rate performance of the decoded picture buffer does not match the exit rate requirement of the HRD, the controller is further configured to apply a degradation scheme, including by disabling the video decoder from decoding the coded video data.

5. The decoder of claim 4, wherein the selected decoder profile is a profile whose exit rate performance matches the exit rate requirement of the HRD.

6. The decoder of claim 4, wherein the selected decoder profile is a profile whose exit rate performance most closely matches the exit rate requirement of the HRD.

* * * * *